US008786275B2

(12) United States Patent
Orrico (10) Patent No.: US 8,786,275 B2
(45) Date of Patent: Jul. 22, 2014

(54) TRANSMISSION GEAR POSITION SENSOR USING PRINTED CIRCUIT ELEMENT (75) Inventor: Mario M Orrico, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 176 days.

(21) Appl. No.: 13/581,374

(22) PCT Filed: Mar. 15, 2011

(86) PCT No.: PCT/US2011/028431
§ 371 (c)(1),
(2), (4) Date: Aug. 27, 2012

(87) PCT Pub. No.: WO2011/115942
PCT Pub. Date: Sep. 22, 2011

(65) Prior Publication Data
US 2012/0319708 A1 Dec. 20, 2012

Related U.S. Application Data (60) Provisional application No. 61/314,903, filed on Mar. 17, 2010.

(51) Int. Cl.
G01B 7/30 (2006.01)
G01D 5/252 (2006.01)
G01D 5/04 (2006.01)
(52) U.S. Cl.
CPC . G01D 5/04 (2013.01); G01D 5/252 (2013.01)
USPC ............ 324/207.25; 324/207.11; 324/207.12; 324/207.22; 324/207.23; 324/245; 702/145; 702/147; 702/151; 702/163; 73/862.331; 73/862.326

(58) Field of Classification Search
USPC ............ 324/207.25, 207.22, 207.23, 207.11, 324/200, 245, 167, 252, 259, 206, 174; 702/145, 147, 151, 163; 73/862.331, 73/862.326, 117.02
See application file for complete search history.

(56) References Cited

U.S. PATENT DOCUMENTS

| | | | |
|---|---|---|---|
| 4,922,063 A | 5/1990 | Shimizu et al. | |
| 5,763,793 A * | 6/1998 | Ng et al. | 73/862.326 |
| 5,923,032 A * | 7/1999 | Carlson et al. | 250/231.13 |
| 6,012,353 A | 1/2000 | Kawakami | |
| 6,075,370 A | 6/2000 | Gardner | |
| 6,340,884 B1 * | 1/2002 | Wolf et al. | 324/207.21 |

(Continued)

FOREIGN PATENT DOCUMENTS

| | | |
|---|---|---|
| EP | 0 936 136 A2 | 8/1999 |
| WO | 90/04122 A1 | 4/1990 |

OTHER PUBLICATIONS

An International Search Report, dated Aug. 11, 2011 in International Application No. PCT/US2011/028431.

Primary Examiner — Tung X Nguyen
Assistant Examiner — Thang Le
(74) Attorney, Agent, or Firm — Mark W. Croll; Paul F. Donovan (57) ABSTRACT A gear position sensor employs a sliding electrical connection between arcuate conductors and flexible wiper arms held on opposite surfaces that rotate relative to each other with the movement of a gear selector shaft. The traces may have multiple segments joined by resistors to provide flexible change in resistance value and resistance range for different applications.

16 Claims, 9 Drawing Sheets

(56) References Cited

U.S. PATENT DOCUMENTS

| | | | |
|---|---|---|---|
| 6,367,337 B1 * | 4/2002 | Schlabach | 73/862.331 |
| 6,483,422 B2 * | 11/2002 | Hosogoe | 338/162 |
| 7,352,174 B1 * | 4/2008 | Lee | 324/207.25 |
| 7,469,462 B2 * | 12/2008 | Richardson et al. | 29/595 |
| 8,692,544 B2 * | 4/2014 | Wolschlager et al. | 324/207.25 |
| 2002/0056322 A1 * | 5/2002 | Hosogoe | 73/488 |
| 2002/0145420 A1 * | 10/2002 | Kimura et al. | 324/207.15 |
| 2004/0041086 A1 | 3/2004 | Imamura | |
| 2004/0255658 A1 * | 12/2004 | Suzuki | 73/118.1 |
| 2007/0008063 A1 * | 1/2007 | Lawrence et al. | 338/116 |

* cited by examiner

TRANSMISSION GEAR POSITION SENSOR USING PRINTED CIRCUIT ELEMENT

CROSS REFERENCE TO RELATED APPLICATION

This Non-Provisional Application is based on International Application No. PCT/US2011/028431, filed Mar. 15, 2011 and claims benefit to U.S. Provisional Application Ser. No. 61/314,903 filed Mar. 17, 2010.

FIELD OF THE INVENTION

The present invention relates to a sensor suitable for sensing a gear position of a mechanical transmission, specifically to a sensor using a printed circuit board element for flexible reconfiguration of the sensor output and sensor range.

BACKGROUND OF THE INVENTION

A mechanical transmission, for example as used in an all-terrain vehicle, may provide multiple gear positions, for example: high, low, neutral, reverse, and park, as are generally understood in the art. Often it is desirable to provide an electrical signal indicating the gear position, for example, to provide visual feedback to the user or as part of an electrically controlled gear shifting mechanism.

An existing sensor for providing this electrical signal indicating gear position uses a set of concentric electrical contacts arranged along arcs about a common center. These contacts may be manufactured as a lead frame insertion-molded into a plastic housing during an injection molding process. A wiper, movable with a gear selection shaft of the transmission, may connect and disconnect different contacts to provide switched signals indicating the gear position.

One drawback to the above design is the expense of producing a lead frame and insertion-molding the lead frame into the housing as well as the high tooling costs when changes in the sensor are required, for example, for different transmission models.

A second drawback to a switched sensor of the type described above is the need for multiple electrical wires to communicate between each of the different contacts and a remote circuit employing the gear position signal. This latter drawback can be addressed by employing a potentiometer that can be turned by the gear selector shaft to output a variable resistance that can be communicated over a single pair of wires instead of the multiple wires needed for multiple contacts. A potentiometer may provide a resistive trace along which a conductive wiper may travel to produce a varying resistance. Standard potentiometers may be insufficiently robust for the transmission environment and specialty potentiometers can require costly retooling when changes are required.

SUMMARY OF THE INVENTION

The present invention provides a sensor applying different resistance values between a pair of conductors using a rotating printed circuit board that moves with a shaft such as the gear selection shaft. The printed circuit board may contain a set of discrete resistors joining arcuate, concentric, conductive traces. Wiper contacts mounted on the housing connect to the arcuate traces to provide the different resistance value outputs. The use of a printed circuit board allows the range and resistance values to be readily adjusted for different applications with low tooling costs.

Specifically, the present invention provides a transmission gear position sensor for a transmission of the type having a rotatable transmission selector shaft. The gear position sensor includes a housing defining an enclosed volume and supporting a first and second conductive element extending from a first location accessible outside of the enclosed volume for electrical connection to a connector harness to a second location within the enclosed volume and a rotating carrier fitting within the enclosed volume receiving a rotatable transmission selector shaft to rotate therewith about an axis. An insulating substrate having a first face holding conductors arcuate about the axis includes resistors bridging adjacent coaxial ones of the arcuate conductors to provide different resistances between the arcuate conductors and a first and second flexing conductive wiper positioned within the housing to engage and electrically connect to the adjacent coaxial ones of the arcuate conductors throughout a range of rotation of the insulating substrate with respect to the first and second flexing conductive wipers. One of the first and second flexing conductive wipers and the insulating substrate are attached to the rotating carrier so that the insulating substrate rotates with respect to the first and second flexing conductive wipers so that rotation of the rotating carrier changes the electrical resistance across the first and second conductive elements.

It is thus a feature of at least one embodiment of the invention to provide a gear position sensor communicating gear position via resistance using a device that permits flexible change in resistances and ranges through the substitution of discrete resistances. It is another feature of at least one embodiment of the invention to eliminate the need for high resistance materials that can resist sliding wear from the flexing conductive wipers.

The insulating substrate may be attached to the rotating carrier and the first and second flexing conductive wipers may be attached to the housing.

It is thus a feature of at least one embodiment of the invention to simplify the construction of the gear position sensor by permitting the flexing conductive wipers to be supported by the conductive elements retained by the housing.

The rotating carrier may be a thermoplastic material having bosses extending outward therefrom to be received by corresponding holes in the insulating substrate so that the latter may be retained by thermoforming ends of the bosses over a surface of the insulating substrate.

It is thus a feature of at least one embodiment of the invention to permit separate fabrication of the insulating substrate from the rotating carrier, the latter which may be injection molded.

The insulating substrate may be a printed circuit board material and the arcuate conductors are traces on the printed circuit board.

It is thus a feature of at least one embodiment of the invention to provide a simple method of fabricating the resistance element adaptable to changes with minimal tooling costs. By using conventional circuit board fabrication techniques different resistances may be readily added to the printed circuit board and/or the traces changed.

The printed circuit board may include traces extending radially from the arcuate conductors for providing solder attachment to the resistors.

It is thus a feature of at least one embodiment of the invention to permit flexible separation of discrete resistive devices independent of the determination of mechanical separation of the traces.

The transmission gear position sensor may provide multiple arcuate conductors of equal radius separated by gaps.

It is thus a feature of at least one embodiment of the invention to provide a simple method of generating stepped resistance changes using a single set of flexing conductive wipers.

The first and second conductive elements may be substantially rigid conductors passing through the housing and the first and second flexing conductive wipers may be supported within the housing by the first and second conductive elements.

It is thus a feature of at least one embodiment of the invention to provide a simple method of mechanical support of the flexing conductive wipers.

The flexing wiper elements may be attached to the substantially rigid conductors by mechanical interference fit.

It is thus a feature of at least one embodiment of the invention to provide a simple method of electrical connection between the wiper elements and the rigid conductors.

The housing may be a thermoplastic material having inwardly extending bosses fitting through corresponding holes in the substantially rigid conductors to hold the substantially rigid conductors to the housing by thermoforming ends of the bosses over a surface of the substantially rigid conductors.

It is thus a feature of at least one embodiment of the invention to provide a method of fixing the first and second conductive elements to the housing without the need for insert molding during injection molding process.

The transmission gear position sensor may further include seals positioned between the housing and at least one of the gear shift and rotating carrier and rotatable transmission selector shaft.

It is thus a feature of at least one embodiment of the invention to provide a variable resistance element robust against environmental contaminants.

The first and second conductive elements may pass through a wall of the housing separating the enclosed volume from the outside into a pocket, the pocket sized to receive a flowable sealing material and an elastomeric seal having openings slidable along the first and second conductive elements to wipe the compound from the first and second conductive elements as the seal is moved to cover the pocket.

It is thus a feature of at least one embodiment of the invention to provide a hermetic seal without the need for in-molded conductors assembled during the injection molding process.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
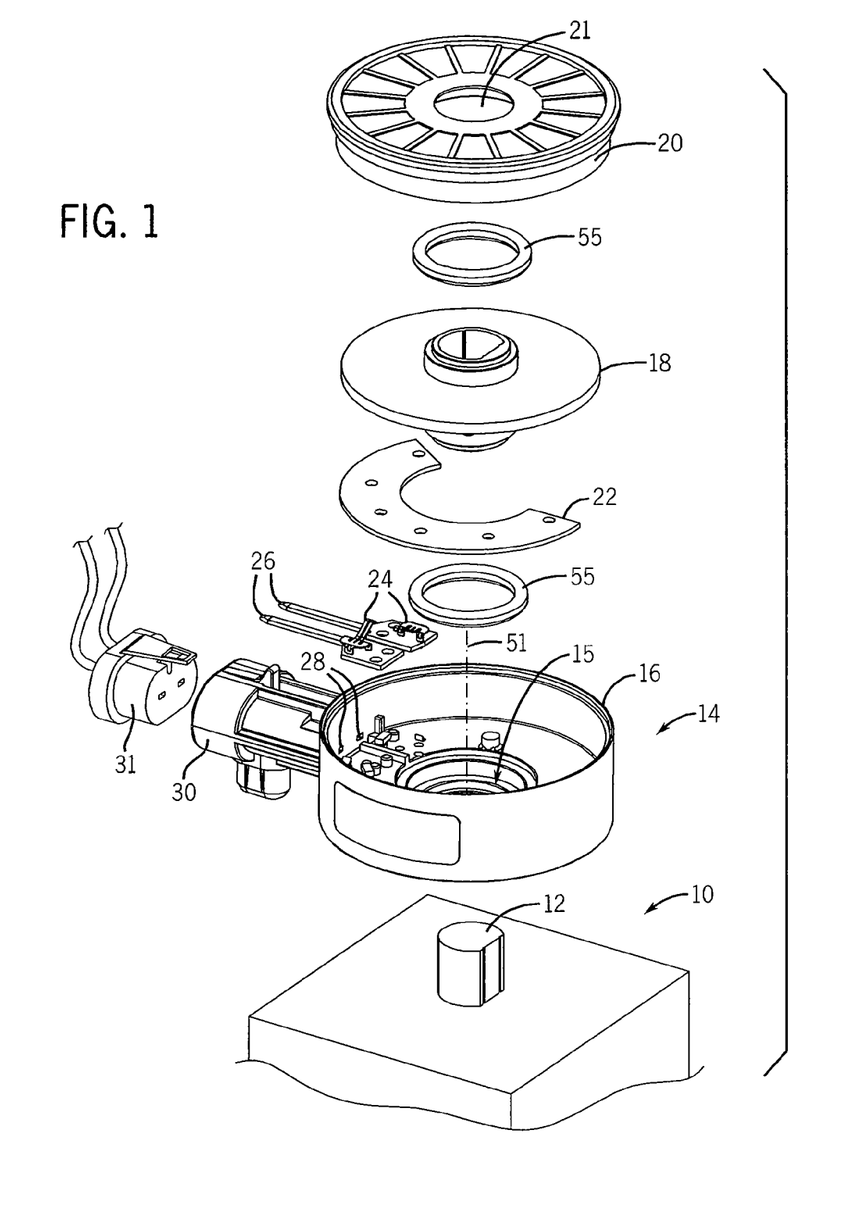
FIG. 1 is an exploded perspective view of a transmission gear position sensor per the present invention showing the housing that may hold a printed circuit board carrier for rotation with a transmission selector shaft within an enclosed volume of the housing and electrical conductors which pass through a wall of the housing into a connector shell for receiving a mating electrical connector.

Referring now to FIG. 1, a transmission 10 may include a gear selection shaft 12 extending therefrom to be received by a gear position sensor 14. The gear selection shaft 12 may extend through an opening 15 in a base of the housing 16 of the gear position sensor 14 to connect with a carrier 18. The gear selection shaft 12 may include a key surface interfacing with a corresponding key in the carrier 18 so that the carrier 18 may rotate with the gear selection shaft 12 inside of the housing 16. A housing cover 20 joins with the housing 16 to define an enclosed volume holding the carrier 18. The housing cover 20 may have a second opening 21 through which a continuation of the gear selection shaft 12 may exit.

An arcuate printed circuit board 22 fits on the underside of the carrier 18 to rotate therewith above two flexing contacts 24. The contacts 24 are each separately supported by portions of different electrical conductors 26 within the enclosed volume of the housing 16 and attached to the housing 16.

The electrical conductors 26 extend from the enclosed volume of the housing 16 through apertures 28 in a wall of the housing 16 into a connector shell 30 open outside of the housing 16 to accept a mating electrical connector 31. Outside of the housing 16, the electrical conductors 26 are formed as pins that may be received by corresponding sockets of electrical connector 31. Inside the housing 16, the electrical conductors 26 provide for flat plates that may be mounted against the base of the housing 16 to provide a support surface for the flexing contacts 24.

Figure 2:
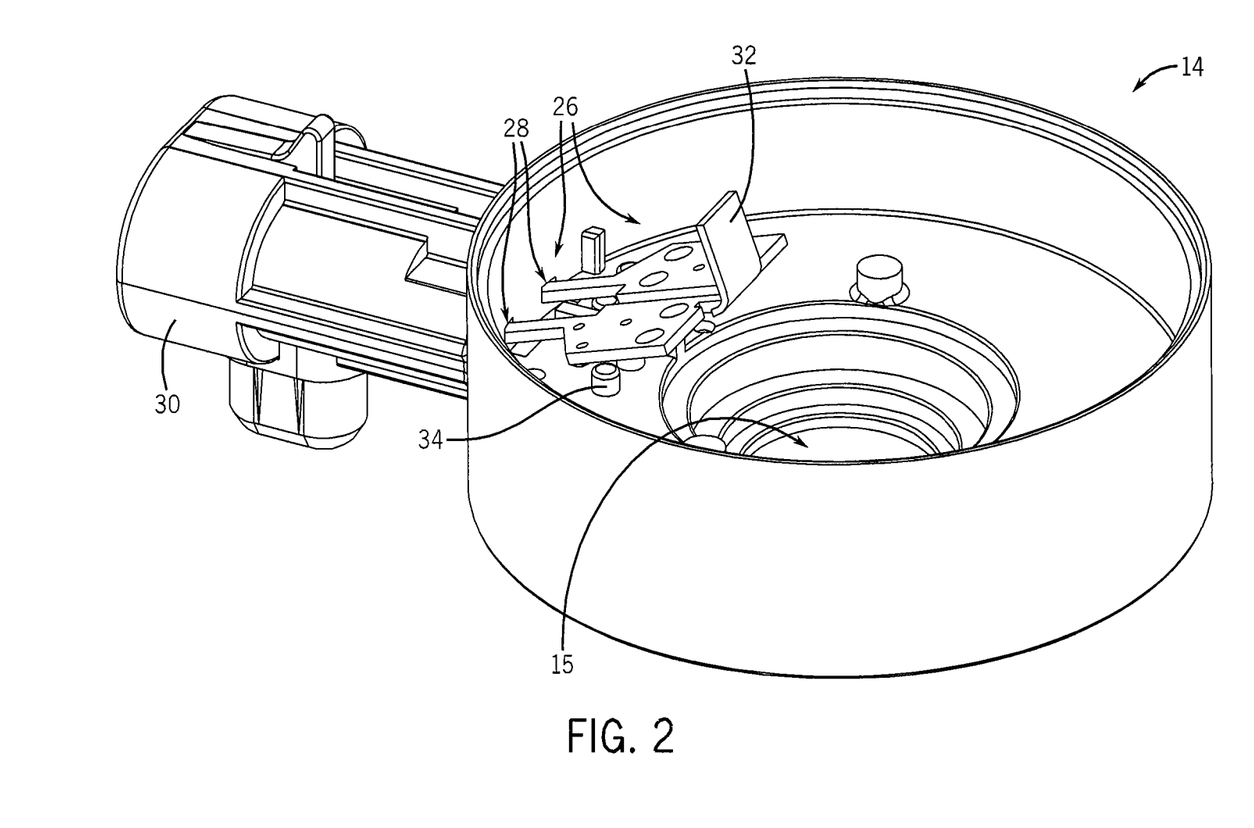
FIG. 2 is a perspective view of the housing of FIG. 1, open to show the electrical conductors during assembly.

Referring now to FIG. 2, the two electrical conductors 26 may be connected by a breakaway tab 32 that aligns them for passage through apertures 28 during assembly and can be removed later to electrically isolate the two conductors 26 from each other.

Figure 3:
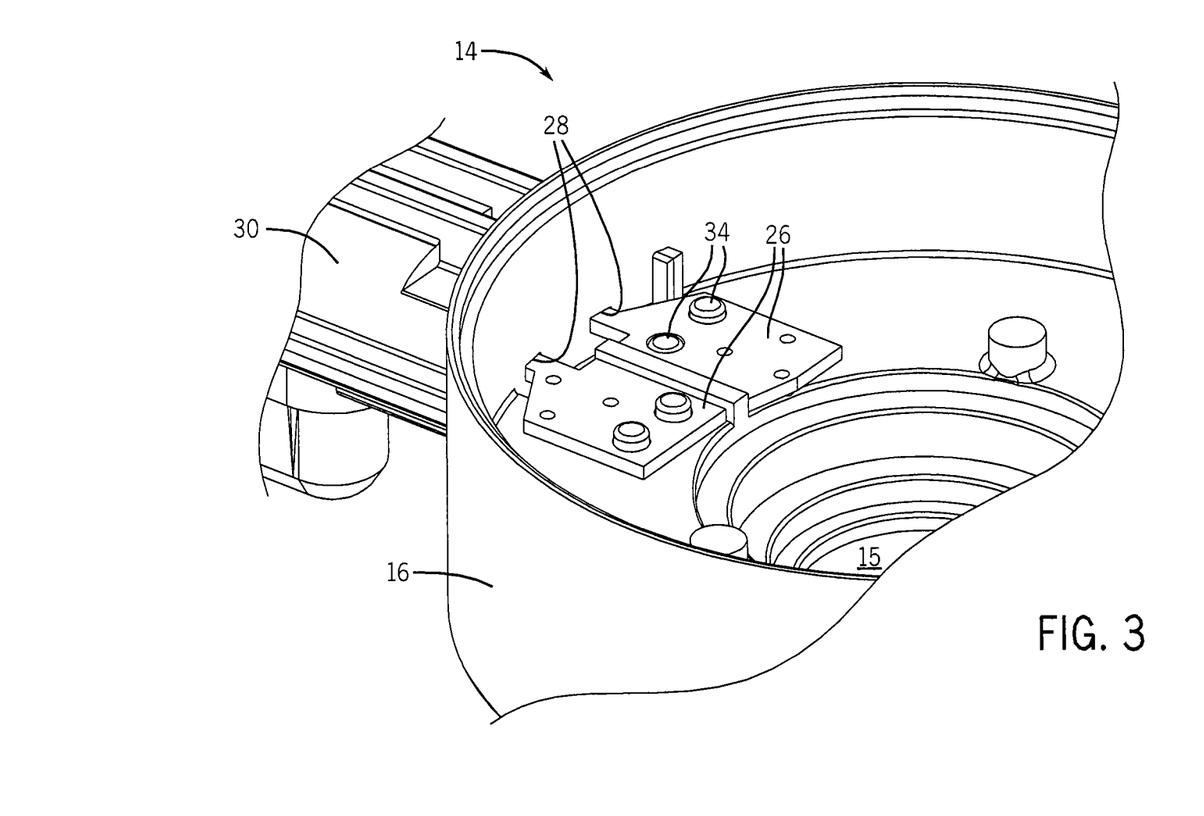
FIG. 3 is a figure similar to that of FIG. 2 showing the electrical conductors staked to the housing with a connecting tab, used for alignment during assembly, removed.

Referring now to FIG. 3, plastic alignment pins 34 may pass upward from the base of the housing 16 through openings in the conductors 26 as mounted against the base of the housing and staked by heat, pressure, or ultrasonic energy over the outer surface of the flat portions of the conductors 26 to attach the conductors 26 to a bottom face of the housing 16.

Figure 4:
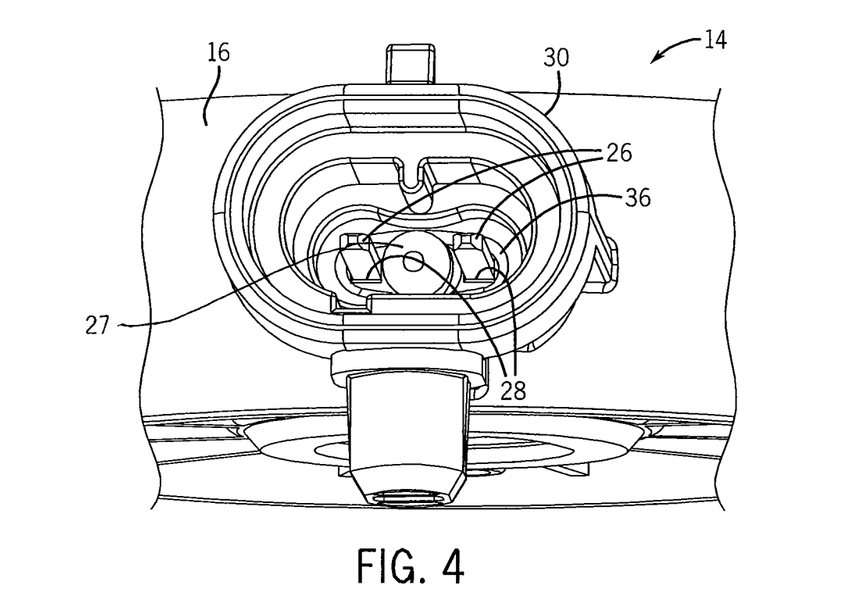
FIG. 4 is a view into the end of the connector shell showing the conductors extending through a wall of the housing into a pocket and a pre-measured amount of sealing compound in the center.
Figure 5:
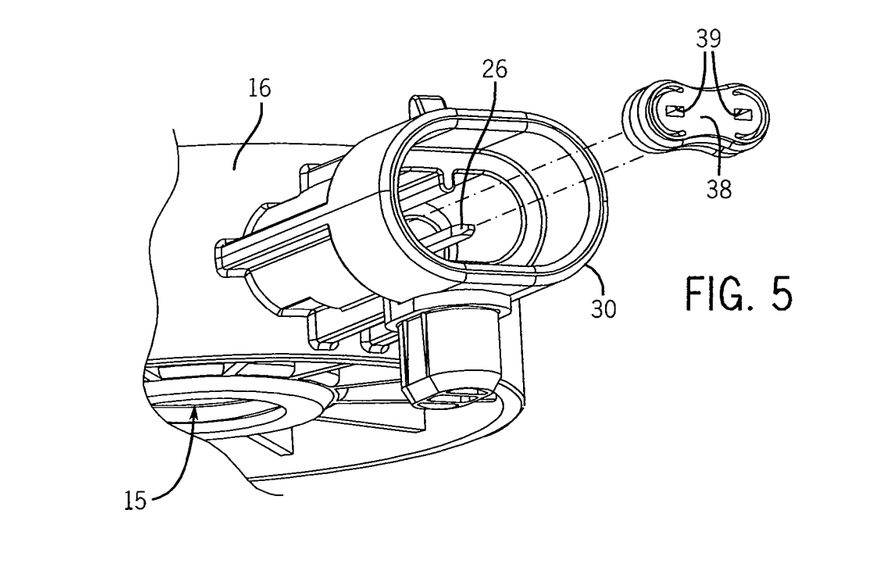
FIG. 5 is a perspective view of the connector shell showing the insertion of an elastomeric plug over the conductors to compress and retain a flowable adhesive material placed in the pocket.

Referring now to FIG. 4, the portions of the conductors 26 extending outward into the connector shell 30 may initially pass through an outwardly opening pocket 36 that may be partially filled with flowable epoxy or other sealant or adhesive 27 (not shown). Referring to FIG. 5, an elastomeric plug 38 may then slide down over the pin portions of conductors 26 (the latter fitting through corresponding apertures 39 of the plug 38) to retain the epoxy within the pocket 36 and to compress the epoxy to fully seal the conductors 26 as they pass through the apertures 28. The apertures 39 in the plug 38 further wipe any misapplied epoxy from the outer surface of the conductors 26.

Figure 6:
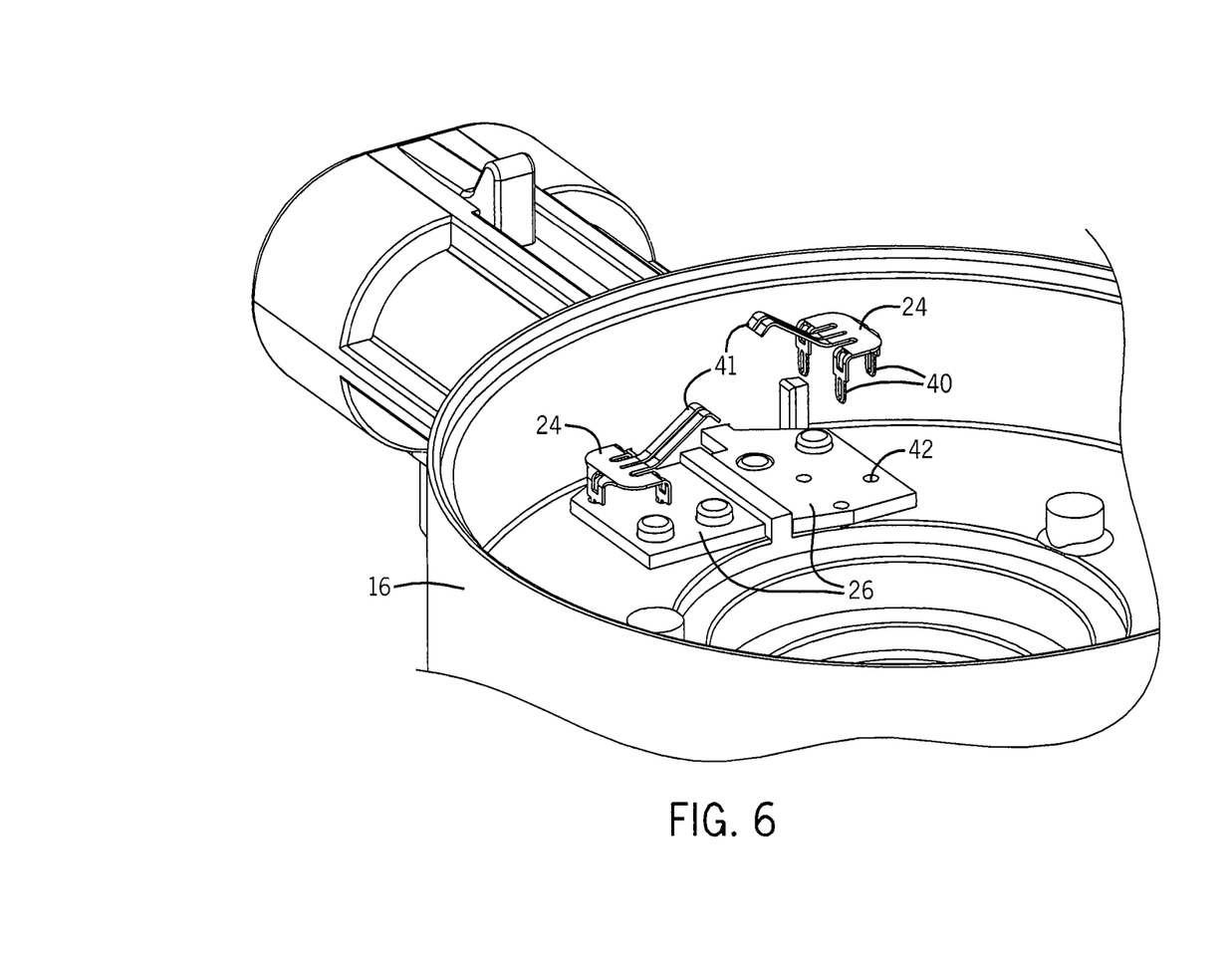
FIG. 6 is a perspective view similar to that of FIGS. 2-3 showing attachment of flexible contact elements to the conductors.

Referring now to FIG. 6, the flexing contacts 24 may have barbed lower extensions 40 that may be press fit for gastight electrical connection to corresponding apertures 42 in the conductors 26 within the housing 16. The conductors 26 may, for example, be brasses stampings. The flexing contacts 24 may provide for cantilevered bifurcated wiper arms 41 extending upward from the base of the housing 16 and may be constructed of a springy material such as a bronze or the like to retain an upward spring bias when pressed downward toward the base of the housing 16.

Figure 7:
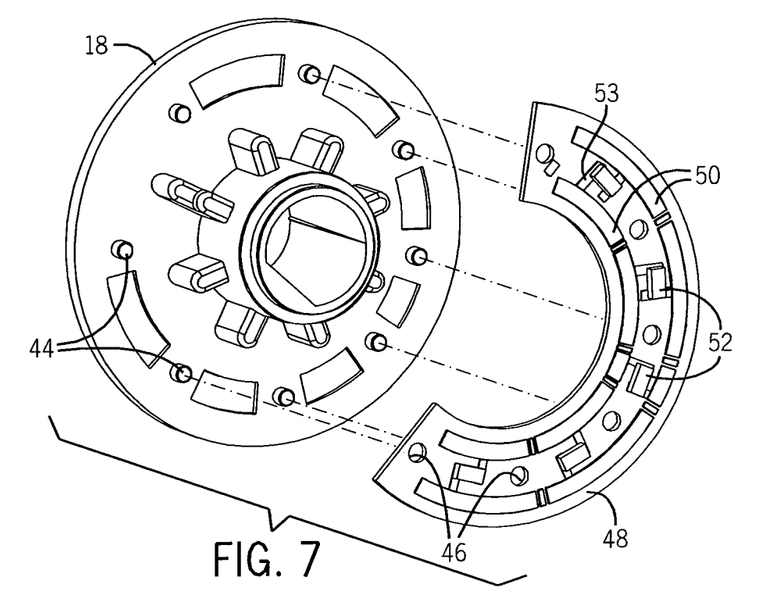
FIG. 7 is perspective exploded view of the underside of the carrier of FIG. 1 showing positioning of an arcuate printed circuit board to the carrier with downwardly exposed traces and discrete resistors.

Referring now to FIG. 7, carrier 18 may provide for downwardly extending pins 44 that may fit within corresponding holes 46 in a semicircular printed circuit board 22. The undersurface of the printed circuit board 22 includes inner and outer electrically independent semicircular traces 50 coaxial about a rotation axis 51 (shown in FIG. 1) of the carrier 18. Each of the traces 50 may be divided into different segments, and each segment is spanned by a different electrical resistor 52. The resistors 52 may be connected to the traces 50 by short radial traces 53, allowing the size of the resistors 52 to be independent of the separation between the traces 50. It will be understood that the resistors 52 and the arcuate extent of the traces 50 may be changed by simple revision of the printed circuit board such as requires very low tooling costs. It is also possible to print the resistors using polymer thick film technology.

Figure 8:
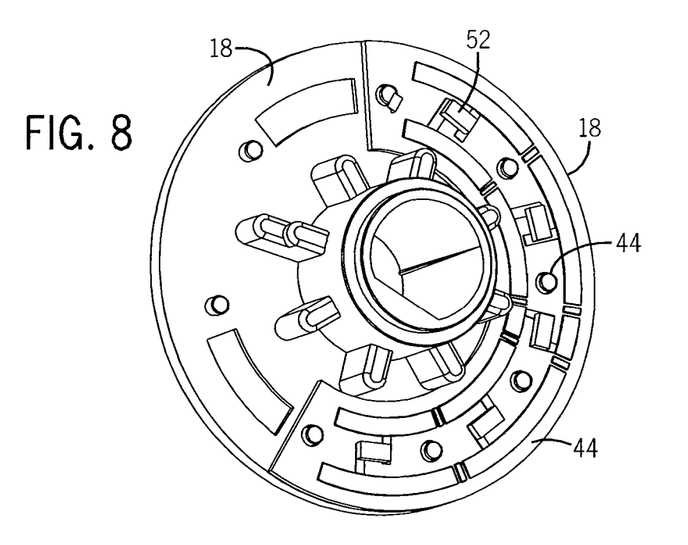
FIG. 8 is a figure similar to that FIG. 7 showing an assembly of the printed circuit board to the carrier by staking operations.

Referring to FIG. 8, the printed circuit board 22 may be retained against the carrier 18 by a heading operation on the pins 44 after the pins 44 are fit to the corresponding holes 46 in the printed circuit board 22.

Referring again to FIG. 1, each of the curved traces 50 may connect to a different one of the flexing contacts 24 so that the different resistors 52 are switched between the conductors 26 with rotation of the carrier 18.

Figure 9:
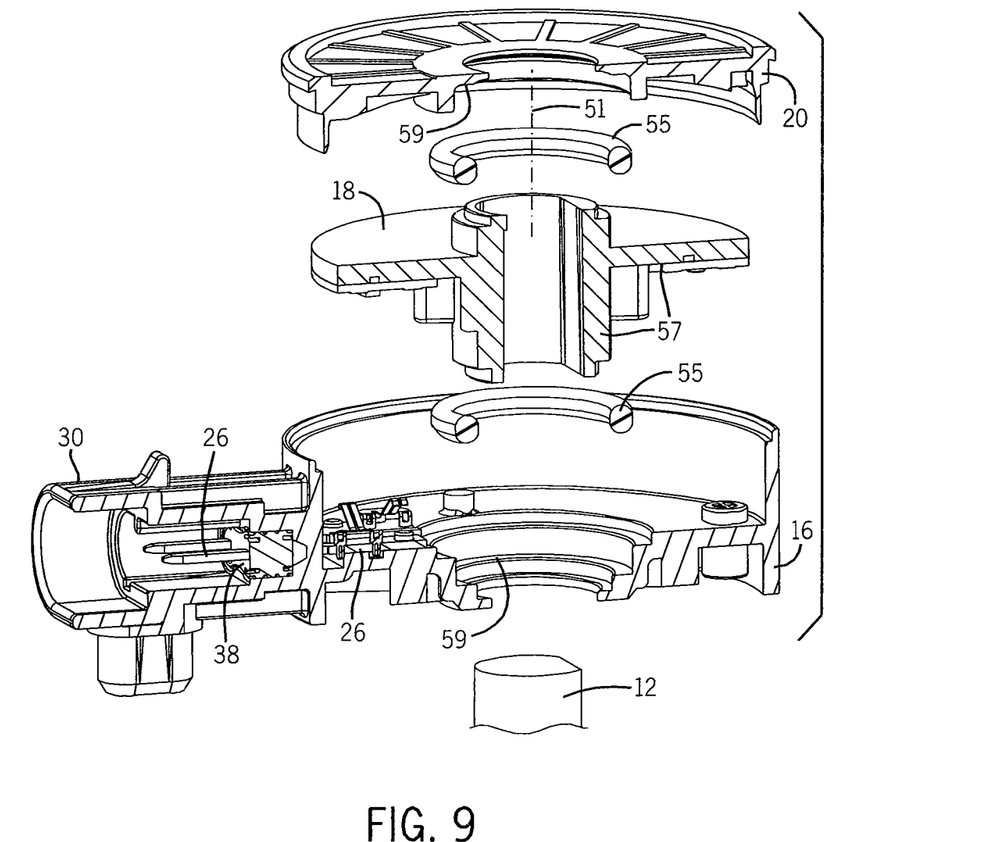
FIG. 9 is an exploded cross-sectional view similar to that of FIG. 1 showing placement of O-rings to seal a transmission selector shaft as it rotates within the housing.
Figure 10:
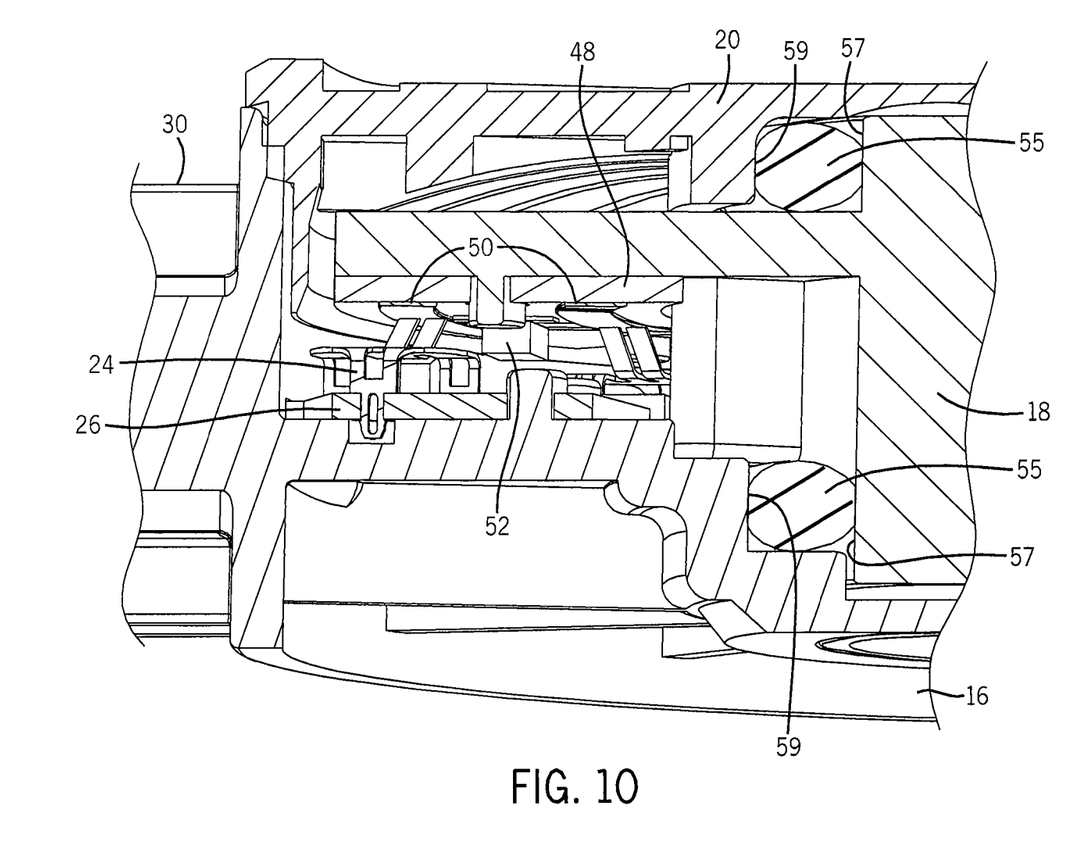
FIG. 10 is a detailed fragmentary cross-sectional view similar to that of FIG. 9 showing engagement between the flexible contact elements and the traces of the printed circuit board.

Referring to FIG. 9, the passage of the gear selection shaft 12 through the housing 16 may be sealed by O-rings 55 fitting between wells 59 of the housing 16 and cover 20 and cylindrical rotor seal surfaces 57 extending upward and downward from the carrier 18 eliminating a seal between the gear selection shaft 12 and the gear position sensor 14 when the gear selection shaft 12 is positioned within the housing 16. The sealing of the O-rings 55 and the interfitting of the flexing contacts 24 against the traces 50 may be seen in FIG. 10.

Figure 11:
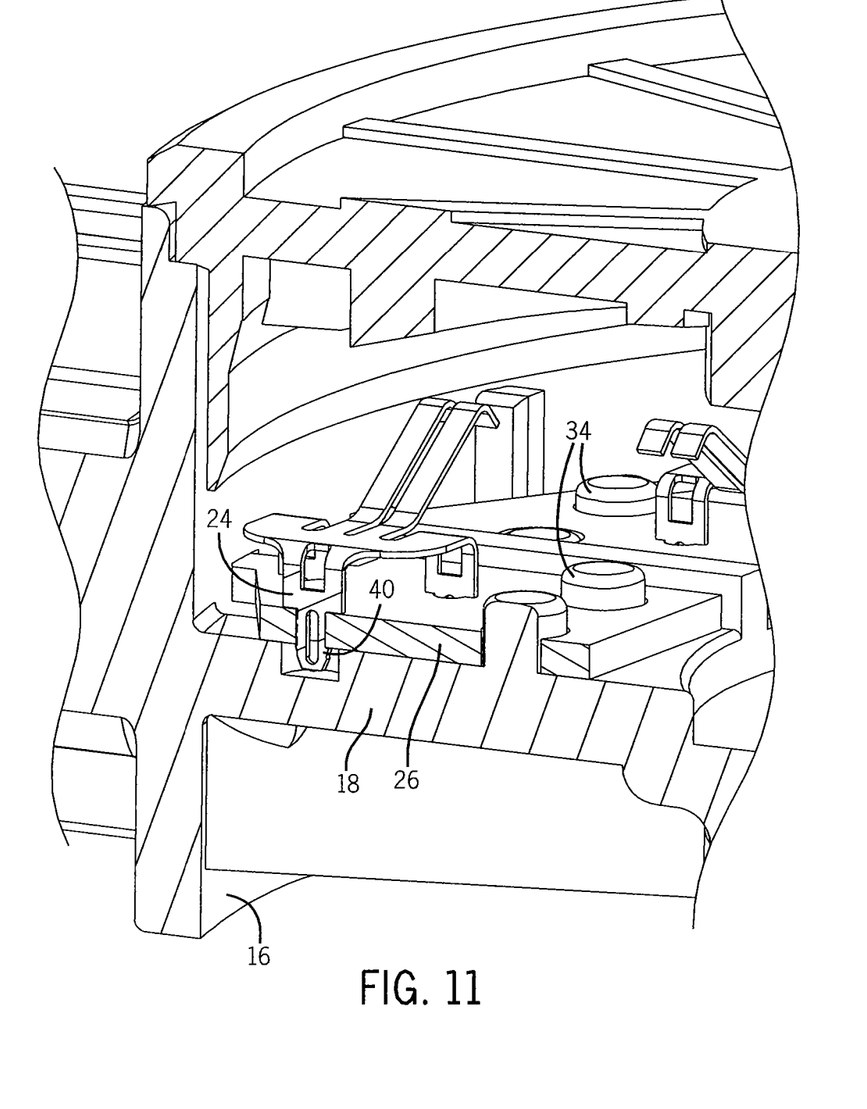
FIG. 11 is a detailed cross-sectional view showing an assembly of the flexible contact elements to the conductors by a press-fit barb element.

FIG. 11 shows a barbed press fit of the flexing contacts 24 into the conductors 26 within the housing 16.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A transmission gear position sensor for a transmission of a type having a rotatable transmission selector shaft, the gear position sensor comprising:
    a housing defining an enclosed volume and supporting a first and second conductive element extending from a first location accessible outside of the enclosed volume for electrical connection to a connector harness to a second location within the enclosed volume;
    a rotating carrier fitting within the enclosed volume receiving the rotatable transmission selector shaft to rotate therewith about an axis;
    an insulating substrate having a first face holding conductors arcuate about the axis and including resistors bridging adjacent coaxial ones of the arcuate conductors to provide different resistances between the arcuate conductors;
    a first and second flexing conductive wiper positioned within the housing to engage and electrically connect to the adjacent coaxial ones of the arcuate conductors throughout a range of rotation of the insulating substrate with respect to the first and second flexing conductive wipers;
    wherein one of the first and second flexing conductive wipers and the insulating substrate is attached to the rotating carrier so that the insulating substrate rotates with respect to the first and second flexing conductive wipers so that rotation of the rotating carrier changes an electrical resistance across the first and second conductive elements.

2. The transmission gear position sensor of claim 1 wherein the insulating substrate is attached to the rotating carrier and the first and second flexing conductive wipers are attached to the housing.

3. The transmission gear position sensor of claim 1 wherein the rotating carrier is a thermoplastic material having bosses extending outward therefrom to be received by corresponding holes in the insulating substrate so that the latter may be retained by thermoforming ends of the bosses over a surface of the insulating substrate.

4. The transmission gear position sensor of claim 1 wherein the insulating substrate is a printed circuit board material and the arcuate conductors are traces on the printed circuit board.

5. The transmission gear position sensor of claim 4 wherein the printed circuit board includes traces extending radially from the arcuate conductors for providing solder attachment to the resistors.

6. The transmission gear position sensor of claim 1 wherein multiple arcuate conductors are of equal radius and separated by gaps.

7. The transmission gear position sensor of claim 1 wherein the first and second conductive elements are substantially rigid conductors passing through the housing and the first and second flexing conductive wipers are supported within the housing by the first and second conductive elements.

8. The transmission gear position sensor of claim 7 wherein the flexing conductive wipers are attached to the substantially rigid conductors by mechanical interference fit.

9. The transmission gear position sensor of claim 7 wherein the housing is a thermoplastic material having inwardly extending bosses fitting through corresponding holes in the substantially rigid conductors to hold the substantially rigid conductors to the housing by thermoforming ends of the bosses over a surface of the substantially rigid conductors.

10. The transmission gear position sensor of claim 1 wherein further including seals positioned between the housing and at least one of the gear shift and rotating carrier and rotatable transmission selector shaft.

11. The transmission gear position sensor of claim 1 wherein the first and second conductive elements pass through a wall of the housing separating the enclosed volume from the outside into a pocket, the pocket sized to receive a flowable sealing material and further including an elastomeric seal having openings slidable along the first and second conductive elements to wipe the sealing material from the first and second conductive elements as the seal is moved to cover the pocket.

12. A method of assembly of a transmission gear position sensor for a transmission of a type having a rotatable transmission selector shaft, the gear position sensor having a housing defining an enclosed volume, supporting a first and second conductive element extending from a first location accessible outside of the enclosed volume for electrical connection to a connector harness to a second location within the enclosed volume; a rotating carrier fitting within the enclosed volume receiving the rotatable transmission selector shaft to rotate therewith about an axis; an insulating substrate having a first face holding conductors arcuate about the axis and including resistors bridging adjacent coaxial ones of the arcuate conductors to provide different resistances between the arcuate conductors; a first and second flexing conductive wiper positioned within the housing to engage and electrically connect to the adjacent coaxial ones of the arcuate conductors throughout a range of rotation of the insulating substrate with respect to the first and second flexing conductive wipers; wherein one of the first and second flexing conductive wipers and the insulating substrate is attached to the rotating carrier so that the insulating substrate rotates with respect to the first and second flexing conductive wipers so that rotation of the rotating carrier changes an electrical resistance across the first and second conductive elements, the method comprising the steps of:

fitting a first and second conductive element through a wall of the housing to extend from a first location accessible outside of the enclosed volume for electrical connection to a connector harness to a second location within the enclosed volume;

attaching the first and second conductive element to the housing;

attaching a first and second flexing conductive wiper to the first and second conductive element within the housing;

fabricating a printed circuit board providing an insulating substrate having a first face holding conductors arcuate about an axis;

attaching resistors bridging adjacent coaxial ones of the arcuate conductors to provide different resistances between the arcuate conductors;

attaching the printed circuit board to a rotating carrier affixed to the rotatable transmission selector shaft to rotate within the housing about an axis so that the printed circuit board rotates with respect to the first and second flexing conductive wipers so that rotation of the rotating carrier changes an electrical resistance across the first and second conductive elements.

13. The method of claim 12 wherein the rotating carrier is a thermoplastic material having bosses extending outward therefrom to be received by corresponding holes in the insulating substrate and including the step of staking ends of the bosses over a surface of the insulating substrate.

14. The method of claim 12 wherein the flexing conductive wipers are attached to the conductive elements by the step of pressing ends of the flexing wiper elements into openings in the conductive elements in a mechanical interference fit.

15. The method of claim 12 wherein the housing is a thermoplastic material having inwardly extending bosses fitting through corresponding holes in the conductive elements and including the step of staking ends of the bosses over a surface of the conductive elements.

16. The method of claim 12 wherein the first and second conductive elements pass through a wall of the housing separating the enclosed volume from the outside into a pocket and including the steps of flowing a sealing material into the pocket and further sliding an elastomeric seal having openings slidable along the first and second conductive elements over the pocket to cover the pocket and to wipe the sealing material from the first and second conductive elements as the seal is moved to cover the pocket.

* * * * *